Figure 4:
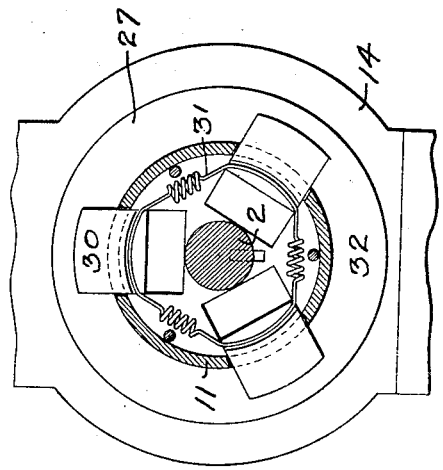

R. VARLEY.
POWER SYSTEM FOR AUTOVEHICLES.
APPLICATION FILED APR. 25, 1913.
1,202,623.
Patented Oct. 24, 1916.
3 SHEETS—SHEET 1.
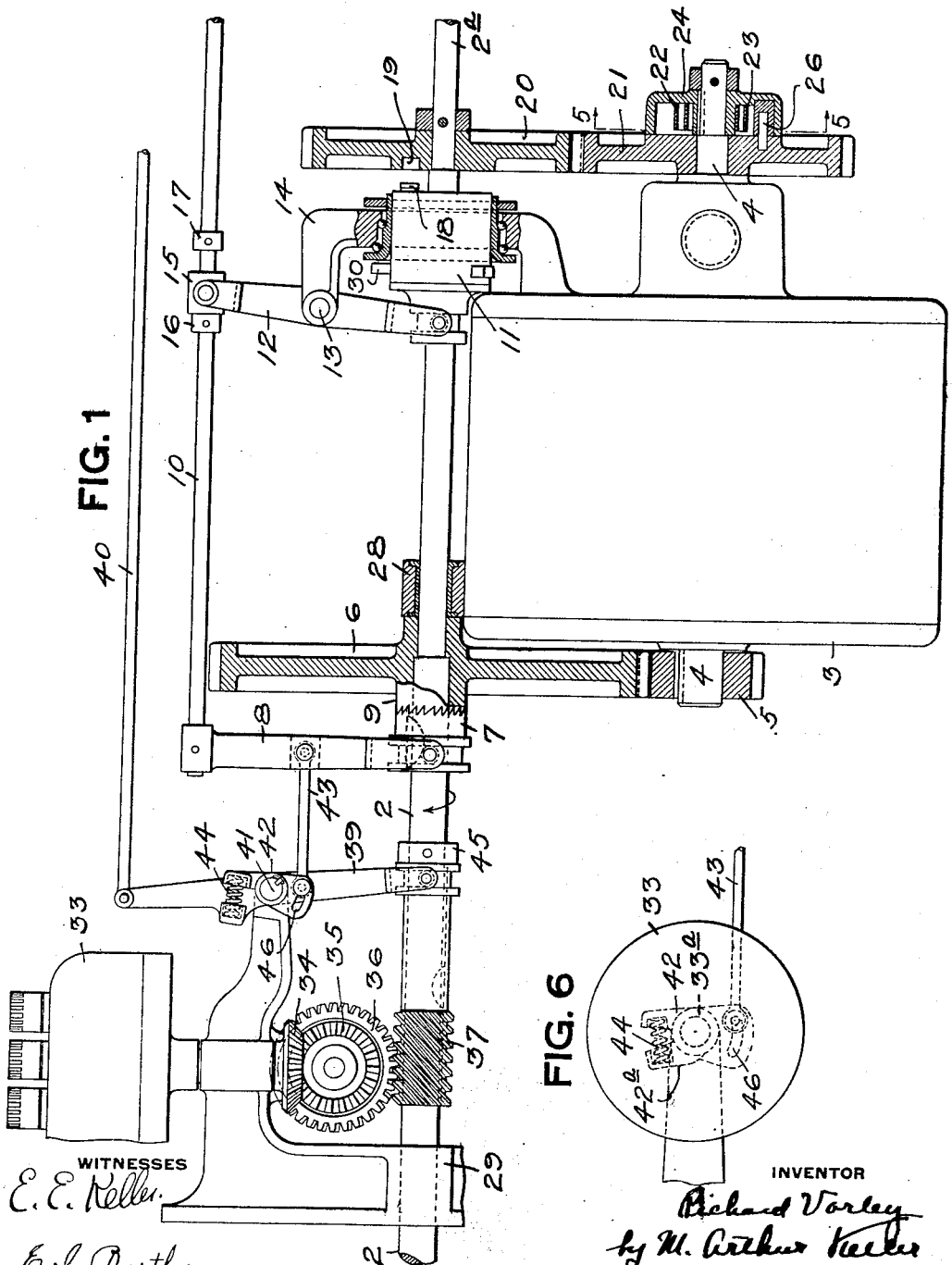
INVENTOR
Richard Varley
by M. Arthur Keller
his attorney
WITNESSES
E. E. Keller
E. S. Barth

R. VARLEY.
POWER SYSTEM FOR AUTOVEHICLES.
APPLICATION FILED APR. 25, 1913.

1,202,623.

Patented Oct. 24, 1916.
3 SHEETS—SHEET 2.

WITNESSES
C. E. Keller.
E. L. Barth

INVENTOR
Richard Varley
by W. Arthur Keller
his attorney

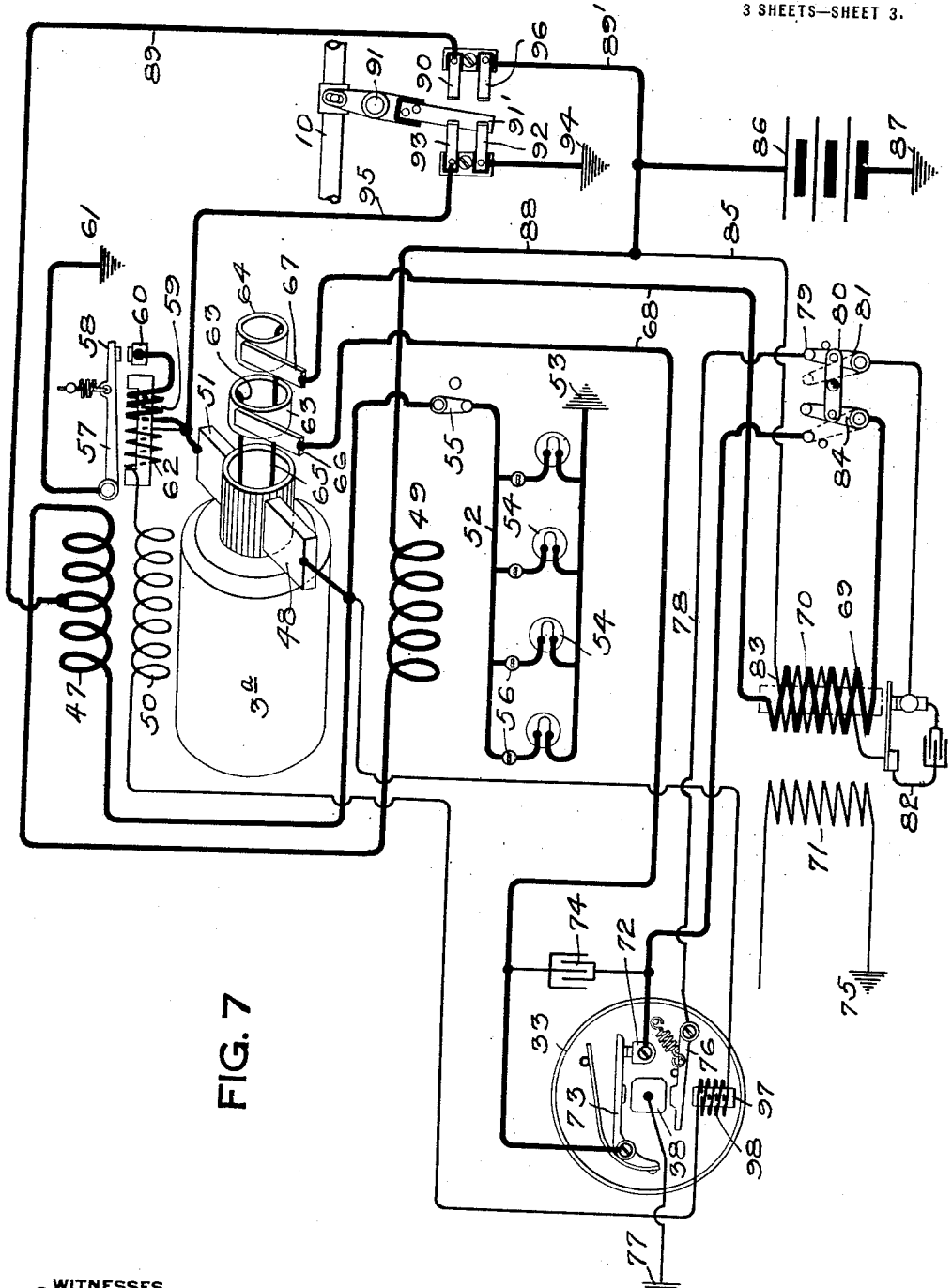

UNITED STATES PATENT OFFICE.

RICHARD VARLEY, OF ENGLEWOOD, NEW JERSEY.

POWER SYSTEM FOR AUTOVEHICLES.

1,202,623.     Specification of Letters Patent.     Patented Oct. 24, 1916.

Application filed April 25, 1913. Serial No. 763,569.

*To all whom it may concern:*

Be it known that I, RICHARD VARLEY, a citizen of the United States of America, residing at Englewood, in the county of Bergen and State of New Jersey, have invented new and useful Improvements in Power Systems for Autovehicles, of which the following is a full, clear, and exact description, reference being had to the accompanying drawings, which form part of this specification.

The invention is a new and improved power system and apparatus for autovehicles, such as automobiles, motor boats, etc.

An object of my invention is to provide a power transmitting mechanism of such character that, with its employment in association with a power transmitting shaft and a power generating element, the engine may be started at a given torque or speed by the power element after which said element may be brought into operative relationship with the power transmitting shaft or propulsive engine at a desirable different speed relation, in a harmonious manner and without imparting or delivering injurious strains or shocks to the power element or power transmitting shaft.

My invention finds advantageous embodiment in a power system for autovehicles, wherein there is employed a power generating element, preferably an electric motor and dynamo or dynamo motor, in such association with a power transmitting shaft that the motor or dynamo first operates to start the engine through driving of the shaft, after which the said power transmitting shaft, driven by the engine, operates the dynamo for generation of current to be utilized by the vehicle equipment usually including a battery or accumulator by means of which the said motor or dynamo element is initially energized for starting of the engine. It is highly desirable that a high torque be obtainable for starting of the engine, which usually necessitates a gear connection between the motor element and power transmitting shaft of large reduction for multiplication of the torque of the power element. Such gear reduction is unsuitable in a driving connection between the generating element and shaft of the engine or power transmitting shaft for driving of the dynamo by the self-propulsive engine; the reverse ratio of the gears offering a speed too high for proper driving of the dynamo and also a degree of inertia which can not be immediately dissipated or overcome, upon sudden starting of the engine.

By my invention I am able to effect a harmonious interchange of speed connections in such manner that a high torque may obtain for starting of the engine after which the motor or dynamo motor may be driven at a speed consonant with its character as a current generating element.

I also aim to provide new and improved features of construction and of arrangement of electric circuits, as will be hereinafter more fully described.

While I have shown my invention as embodied in preferably apparatus and circuit arrangements, it will be premised that changes may be made therein without departing from my invention, and I therefore do not desire to limit myself to the mechanism and arrangement particularly shown.

Figure 5:
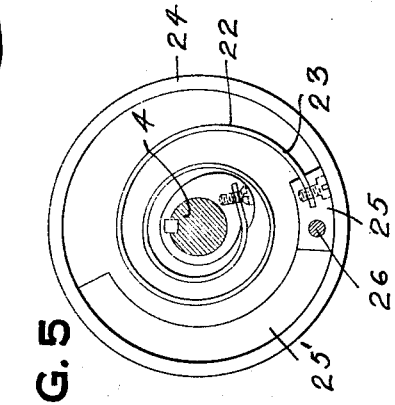
Figure 2:
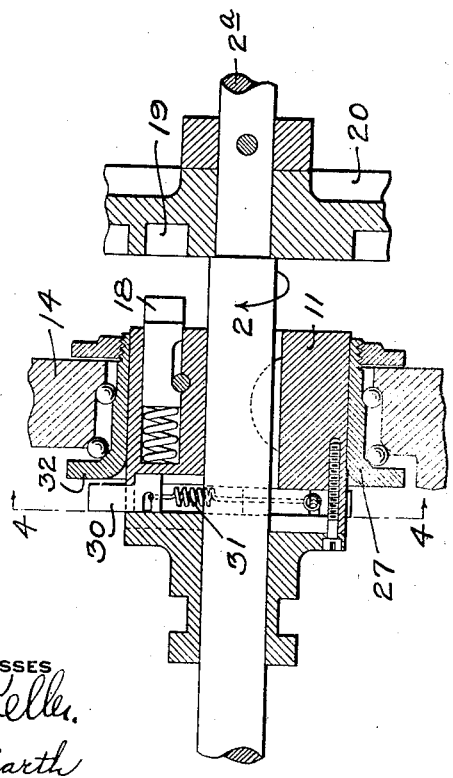
Figure 3:
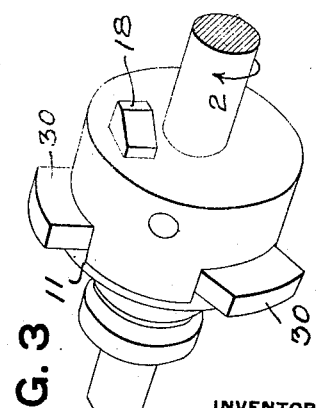

Figure 1 is a side elevational view of apparatus and system embodying my invention, being partly in section; Fig. 2 is an enlarged vertical sectional view of the clutch element adapted for establishing driving connection between the power transmitting shaft and the dynamo element when it is desired to operate said dynamo by the engine; Fig. 3 is a perspective view thereof; Fig. 4 is a section on the line 4—4 of Fig. 2; Fig. 5 is a section on the line 5—5 of Fig. 1; Fig. 6 is a fragmentary top plan view, showing modified manner of connecting the ignition controller with spark retarding mechanism; and Fig. 7 is a diagrammatic view showing preferable circuit arrangement of my system; all of said views being hereinafter more fully described.

Referring to Figs. 1 to 5 inclusive, the numeral 2 indicates a power transmitting shaft which may comprise the engine shaft or an auxiliary shaft associated with the engine, as hereinafter described, in such manner that the shaft may transmit power to the engine from a motor element 3, after which the shaft may be driven by the engine for operation of the motor element to store or accumulate and furnish power for the vehicle equipment.

The element 3 preferably takes the form of a dynamo electric machine which may be of any suitable design or construction but which preferably embodies the arrangement shown in Fig. 7, as hereinafter described. The shaft 4 of the dynamo motor element fixedly carries a pinion 5 meshing with which is a gear 6 normally loosely carried by and held against longitudinal shifting on the shaft 2. Keyed to the shaft 2 is a slidable clutch collar 7 controllable by a shifting yoke 8, for movement into and out of engagement with the clutch face 9 on the gear 6. This yoke 8 is carried by an operating rod or shaft 10 operatively associated with which is a clutch member 11, through the medium of a yoke lever 12 pivoted at 13 to a frame member 14 of the dynamo motor 3 or other fixed support. The upper end of the lever 12 is pivoted to the sleeve or collar 15 loosely carried by the operating rod 10 and between fixed collars or shoulders 16 and 17 also carried by said rod 10. The clutch member 11, which is keyed to the shaft 2, (see Figs. 1, 2 and 3) carries a spring pressed clutch dog or finger 18 adapted for engagement with a clutch pocket 19 formed in a gear 20 loosely journaled on the reduced portion 2ª of the shaft 2. Meshing with the gear 20 is a similar 21 carried by the dynamo motor shaft 4. As shown in Figs. 1 and 5 connection between the shaft 4 and the gear 21 is effected through means of a yieldable coupling 22 which comprises preferably a spring 23 mounted within a casing 24 fixedly carried by the shaft 4. The outer end of the spring 23 is fastened to a slidable block 25 carried by the casing 24, to which block the gear 21 is connected by means of a finger or pin 26.

As shown in Figs. 1 and 2 the clutch member 11 is mounted within a ball bearing sleeve or collar 27 carried by the frame member 14, in such manner that the said clutch member 11 may constitute a bearing for the shaft 2 otherwise journaled in any suitable manner, such as bearing pieces 28 and 29. Carried by the member 11 are a plurality of weights or radially slidable fingers 30 normally held in a retracted position by means of a suitable spring 31 preferably commonly associated with all of said members 30 in the manner clearly shown in Figs. 2 and 4. Upon sudden impulsive driving of the shaft 2, incident to assumption of self-propulsion of the engine, the members 30 will be centrifugally extended, as shown, in such manner as to be brought into abutment with the forward end 32 of the member 27 should an attempt at such time be made to connect the shaft 2 with the gear 19, as hereinafter set forth. When the clutch member 11 has been shifted so as to bring the clutch dog 18 into engagement with the pocket 19, the centrifugally actuated members 30 will occupy a position within the sleeve member 27 which preferably rotates with the shaft 2 and clutch member 11 and thereby offers no friction or resistance to said members 30 upon tendency thereof to expand or fly outwardly upon subsequent building up or acceleration of the speed of the shaft 2.

Referring again to Fig. 1, the numeral 33 indicates an ignition controller or timer operatively geared to the shaft 2 through the medium of beveled gears 34 and 35 and spiral or worm gears 36 and 37. The worm 37 is preferably keyed to the shaft 2 and slidably shiftable thereon for obtaining spark adjustment of the controller; adjustment in this instance being effected by shifting of the controller cam or actuating member 38. (See Fig. 7.) A pivoted lever or yoke 39 is employed to shift the worm 37 to obtain this spark adjustment, which lever connects with an operating rod 40 which may lead to the running board of the vehicle in the usual manner. Loosely carried by the pivot 41 of the yoke or lever 39 is a double armed lever 42 one arm of which connects with the clutch yoke 8 or operating rod 10 of the clutch shifting mechanism by a link 43, and interposed between the other arm and the lever 39 is a compression spring 44.

When it is desired to start the engine, the operating rod 10 is shifted so as to bring the clutch member 7 into engagement with the clutch element 9 of the gear 6 upon which, and energizing of the dynamo motor, preferably in the manner hereinafter described, rotation of the pinion 5 will set up driving of the large gear 6 which will, in turn, drive the shaft 2, through the clutch member 7, for starting of the engine. Upon shifting of the operating rod 10 to engine starting position the collar 16 thereof will be shifted to such position as to rock the lever 12 and bring the clutch member 11 to the position shown in Fig. 1 or out of operative driving relationship with the gear 20. Also, shifting of the clutch 7 into engagement with the gear 6 will shift the ignition controller to spark delay position by reason of longitudinal shifting of the worm gear 37 to full spark retard position against a stop collar 45, through the medium of the link 43 above described.

After the engine has become self-propulsive and it is desired to bring the dynamo motor out of engine driving or starting relationship with the shaft 2, the clutch members 7 and 9 are disengaged by shifting of the rod 10. Such disconnection of the clutch members or return movement of the yoke 8 will not disturb the previous adjustment of the ignition controller to spark delay position, by reason of the fact that the connection of the link 43 with the double armed lever 42 is preferably flexible or such as to provide a lost motion connection, such as by reason of a slot 46 through which pivotal connection exists between the members 42 and 43.

It is the practice in starting of the engine of an autovehicle to disconnect or start it while free from connection with the usual transmission mechanism or running gear of the vehicle so that there is no unnecessary load placed upon the engine at starting, such mechanism being clutched in after the engine has become self-propulsive. The result is that the unloaded engine immediately builds up in speed with induction of self-propulsion. Upon disconnection of the clutch members 7 and 9 and starting of the engine with attendant high degree of speed rotation of the shaft 2 the centrifugal members 30 immediately fly outwardly in such manner as to prevent shifting of the clutch member 11 within the collar 27 into clutch engagement, at an injurious speed, with the gear 20; it being understood that the collars 16 and 17 are so spaced apart on the operating rod 10 as to permit of disengagement of the clutch members 7 and 9 and bringing of the dynamo motor out of engine starting relationship, without simultaneously connecting the shaft 2 into driving relationship with the dynamo motor for operation of the latter as a generator. As soon as the speed of the shaft 2 has been reduced, as by connecting the engine with the transmission mechanism of the vehicle, the centrifugally actuated members 30 will be drawn inwardly or retracted by means of the tension device 31 so as to permit of shifting of the clutch member 11 in such manner as to bring the clutch dog 18 into position for engagement of the pocket 19 of the gear 20. Should the spring dog 18 not directly engage the pocket 19 it will ride upon the face of the gear until it has been brought into a position of reception by said pocket, and upon connection of the gear 20 with the shaft 2 rotatory travel will be imparted to the gear 21 for driving of the dynamo motor as a generator.

The yieldable coupling 22, above described, guards against transmission of shocks to the dynamo motor when the gears 20 and 21 are clutched in. Transmission of motion to the gear 21 tends to move the member 25 of the yieldable coupling along the guide way 25' against the tension of the spring 23, but as soon as the inertia is overcome the spring 23 will shift the block 25 back to its normal position; the tension of the spring being such as to maintain a non-variable connection between the gear 21 and the dynamo motor shaft 4 under normal driving of the dynamo motor.

As stated above the dynamo motor may be of any suitable construction, but for the attainment of certain desired ends I may employ the dynamo motor and circuit arrangements diagrammatically indicated in Fig. 7, as illustrative of the principle of my invention. In this Fig. 7 I show a dynamo motor adapted to deliver direct and alternating current and of a character wherein a high magnetic field may be created and maintained for starting of the engine and may be subsequently so weakened or controlled as to bring said element as a generator into harmony with the requirements of a lamp or work circuit and ignition circuit of the vehicle equipment.

Upon one pole piece (not shown) is a field winding 47 connected at one end to a commutator brush 48, while to the other end of said winding is serially connected a field winding 49 which is preferably mounted upon a diametrically disposed field pole (not shown). Adjacent the winding 47 is a shunt winding 50 connected across brushes 48 and 51.

The numeral 52 indicates a lamp circuit connected to brush 48 and having ground connection 53. Lamps 54 are arranged preferably in parallel therein and may be controlled either collectively by a switch 55 or individually by switches 56. A relay 57 has an armature 58 which, when attracted, closes a circuit through relay winding 59, contact 60, and ground 61, as hereinafter described; the relay winding 59 being wound in opposition to a major or larger relay winding 62 connected to brush 51 and shunt winding 50.

The numerals 63 and 64 indicate collector rings which connect to the winding of the armature 3ª by taps 65 leading from said winding preferably at oppositely disposed points or 180 degrees apart so as to cause symmetrical impulses of current to be impressed upon said connector rings in each revolution of the armature for ignition service. From collector brushes 66 and 67 leads a primary circuit 68 included in which is a primary coil or winding 69 of ignition coil mechanism 70; this primary winding being in inductive relationship to a secondary winding 71 of ignition apparatus. Intercalated in the primary circuit and preferably carried by the ignition controller is an interrupter mechanism comprising essentially a fixed contact 72 and a movable contact lever 73 pivoted to be rocked or oscillated by the controller cam 38, while connected across said contacts is the usual condenser 74. The secondary winding 71 is grounded, as at 75, and may connect with the usual distributer (not shown) of spark producing apparatus, from which distributer conductors connect to the spark plugs of the engine in a well known manner. Also carried by the ignition controller 33 is an insulated contact lever 76 arranged for contactual engagement by the cam 38 which is preferably grounded, as at 77. The lever 76 connects by lead 78, with a switch contact button 79 of a double armed switch 80, the arm 81 of which operates for connection of the lead 78 with vibrator mechanism 82 and associated primary winding 83 of the coil 70 and inductively related to the secondary winding or coil 71. The other arm 84 of the double armed switch controls connection of the primary alternating current ignition circuit 68; the arrangement of the switch being such as to render the alternating current ignition circuit inoperative during utilization of the direct current circuit and to render the last named circuit inoperative during use of the alternating current circuit, as hereinafter described. The opposite end of the winding 83 of the spark producing apparatus, connects by lead 85 with a battery or accumulator 86 which is grounded, as at 87.

The field winding 49 of the dynamo motor also connects with the battery, as by lead 88, while a lead 89 taps the field winding 47 preferably at a median point and connects with a switch contact 90 of switch mechanism 91 operatively controlled by the shaft 10 or operating rod above described. The switch mechanism 91 comprises a pivotal switch blade 91' adapted to complete a motor energizing circuit through contacts 92 and 93, ground 94 and lead 95 and also to complete alternatively part of a battery charging circuit through contacts 90 and 96 and lead 89—89', as hereinafter described.

Carried by the controller 33 is an electromagnet 97 having a winding 98 which is connected in circuit with field winding of the dynamo motor, preferably the shunt winding 50, leading to brush 48. This magnet 97 is mounted in such juxtaposition to the contact lever 76 of the direct current ignition circuit as to attract the said contact lever and thereby draw it out of service or to a non-operative position after the engine has become self-propulsive and the spark producing apparatus is capable of running on the alternating current circuit, as hereinafter set forth.

It will be seen that upon shifting of the operating rod 10 of the power transmitting mechanism, in such manner as to move the clutch member 7 toward the gear 6, the ignition controller cam 38 will be shifted relatively to the rotatory travel of the shaft 2, to spark delay position by reason of attending shifting of the worm gear 37 along the shaft 2 to the position shown in Fig. 1. Continued movement will bring the clutch member 7 into clutch engagement with the clutch face 9 of the gear 6, the spring 44 of the controller connection permitting of further movement of the shifting yoke 8 after the controller has been shifted to spark delay position, and the switch member 91' (see Fig. 7) will be shifted into contactual engagement with the switch members 92 and 93, thereby completing a circuit from battery 86, through ground 94, lead 95, shunt winding 50 and series field winding 47 and 49, back to battery. Resultant energizing of the dynamo motor will set up driving of the shaft 2 through the gears 5 and 6, as above described, and if it is desired to complete the ignition circuit for energizing of the spark producing apparatus, the double armed switch 80 is shifted to the position shown in Fig. 7 wherein the switch arm 81 connects the vibrator coil into circuit with the battery 86, so that upon contact of the cam 38 of the controller (which as is well understood is geared in synchronism with the engine) with the lever 76, incident to driving of the shaft 2, the winding 83 of the vibrator coil mechanism will be energized, thus inducing in the secondary winding 71 a high potential ignition current which is distributed to the cylinders of the engine in the usual manner for explosion of the combustible charge or charges therein.

With the ignition controller shifted to spark delay position, liability to premature explosion of the combustible mixture or back firing of the engine is overcome, and upon induction of self-propulsion of the engine the dynamo motor is brought out of starting relationship with the shaft 2 by declutching the members 7 and 9. Such disconnection of the dynamo motor and the shaft 2, however, does not disturb the ignition controller from spark delay position, as has been previously described, and high speed rotation of the shaft 2, attendant upon assumption of self-propulsion of the engine, causes the members 30 of the clutch 11 to respond to the resultant centrifugal force in such manner as to prevent the latter from being shifted, during such initial abnormal high speed of rotation, into operative driving relationship with the gear 20, but reduction of the speed of the shaft 2 driven by the engine, enables the shifting rod 10 to be so advanced as to rock the lever 12 for movement of the clutch member 11 toward and the clutch dog 18 into engagement with the clutch face of the gear 20.

Shifting of the operating rod 10, for declutching of the engine starting clutch or members 7 and 9, brings the switch blade 91' out of engagement with contacts 92 and 93, thereby breaking the dynamo motor energizing circuit, and into engagement with switch contacts 90 and 96 for the partial completion of a battery charging circuit established upon closing of the relay armature 58, as set forth below. As the speed of the armature 3ª increases (being driven by the engine) the current in the shunt winding builds up, so that when it reaches battery charging value the winding 62 so energizes the relay as to close the armature 58 and thereby establish a battery charging circuit connection from brush 51, through relay winding 59, contact 60, relay armature 58 and grounds 61 and 87, to battery, the opposite terminal of the battery leading to a portion of the series field winding 47 (the active portion, as hereinafter described) back to brush 48.

During starting of the engine, or connection of the battery in dynamo motor energizing relationship, the current flow in the shunt winding and in the series field winding is unidirectional so that these windings assist one another in the production of a high magnetic field and resultant great starting torque. When the dynamo motor is being driven by the engine, the series field winding 49 and part of series field winding 47 is cut out, and the generated current flow in the shunt winding is in opposition to the current flow in the active part of the upper series field, so that there is presented a substantially neutralizing action resistive to tendency to undue increase of flux or potential upon increased speed of the dynamo motor, which action or control operates for maintenance of a constant voltage with attending normal effect upon the lamp or work circuit and the alternating current ignition circuit.

After the engine has become self-propulsive and it is desired to utilize the alternating current ignition circuit, the double armed switch 80 is shifted to the dotted position shown in Fig. 7 whereby the direct current circuit leading from the battery is broken and the alternating current circuit 68 is established for periodical opening and closing by the interrupter mechanism for energizing of the primary winding 69 and inductively the secondary winding 71. Thus, as will be readily understood, with charging of the primary coil through synchronous closing and opening of the contacts 72 and 73 and resultant charging and discharging of the condenser 74 a very high potential current is generated in the secondary winding 71 for utilization at the spark plugs.

Increased voltage of the field of the dynamo motor, and more especially in the shunt winding 50, causes an energizing of the electromagnet 97 with the result that the contact member 76 is drawn out of operative association with the controller cam 38 and held in such inoperative position during driving of the dynamo motor by the engine at a speed productive of efficacious alternating ignition current. Where the double armed switch has not been shifted to alternating current connection after starting of the engine and after the dynamo motor has reached a speed or voltage output capable of properly energizing the alternating current ignition circuit, automatic withdrawal of the contact lever 76, by the electromagnet, from contact service, will operate as a signal for the chauffeur or operator to shift the switch to alternating current circuit connection; such sign or signal being produced by the resultant and apparent interruption of the continuity of firing of the engine.

In Fig. 6 I show a modified manner of shifting the ignition controller to spark delay position. This construction may be employed in connection with controllers spark adjustment of which obtains through shifting of the casing of the controller in a well known manner. In this view the double armed lever 42 is concentrically pivotally carried by the controller shaft and the compression spring 44 is interposed between an arm of the lever 42 and an arm 42ª carried by a hub portion 33ª of the controller. The connecting link 43 may connect with the operating shaft 10 in any desired manner. It will be seen that upon rocking of the lever 42, incident to connection of the dynamo motor in engine starting relationship, the controller will be adjusted to spark delay position, as in the case of the controller connection shown in Fig. 1.

The advantages of my invention will be readily appreciated since I provide a system in which mechanism is afforded whereby a high starting torque is available and in which variable speed relationships may be effected between the several moving instrumentalities in a harmonious manner and without attendant transmission of injurious strains or shocks to the mechanism; in which a novel form of controller driving or connecting mechanism is provided; and wherein an electric system operates for the production of the highest efficiency with the minimum expenditure of energy and with absence or reduction of wear of moving parts.

It will be apparent, without necessity of specific illustration, that many changes may be made in the construction and arrangement shown and described without departing from my invention. While I have shown a particular form of speed control for the clutch mechanism and have also shown a certain form of yieldable coupling or shock absorber between the dynamo motor and power transmitting shaft, such devices may take different embodiments without departing from the principle involved. Furthermore, it is also obvious that the manner of controlling the ignition timer contacts may be varied.

Having thus described my invention, what I claim and desire to secure by Letters Patent is:

1. In a system of the class described, the combination with a combustion engine, of a shaft, gearing whereby the shaft is adapted to transmit power to and be driven by the engine, a power element for transmitting power to the shaft for starting of the engine and adapted to be driven from the shaft, gearing connection between the shaft and power element whereby the latter may operate, at one speed relationship, the shaft for starting of the engine, and means for subsequently operatively connecting the shaft in driving association, at a different speed relationship, with the power element.

2. In a system of the class described, the combination with a combustion engine, of a shaft, gearing whereby the shaft is adapted to transmit power to and be driven by the engine, a power element for transmitting power to the shaft for starting of the engine and adapted to be driven from the shaft, gearing connection between the shaft and power element whereby the latter may operate, at one speed relationship, the shaft for starting of the engine, clutch means for controlling said connection between the shaft and the power element, and means for subsequently operatively connecting the shaft in driving association, at a different speed relationship, with the power element.

3. In a system of the class described, the combination with a combustion engine, of a shaft, gearing whereby the shaft is adapted to transmit power to and be driven by the engine, a power element for transmitting power to the first shaft for starting of the engine and adapted to be driven from the shaft, reducing gears for connecting the shaft and the power element whereby the latter may operate at one speed relationship, the shaft for starting of the engine, and means for subsequently operatively bringing the shaft into driving association, at a different speed relationship, with the power element.

4. In a system of the class described, the combination with a combustion engine, of a shaft, gearing whereby the shaft is adapted to transmit power to and be driven by the engine, a power element for transmitting power to the first shaft for starting of the engine and adapted to be driven from the shaft, reducing gears for connecting the shaft and power element whereby the latter may operate, at one speed relationship, the shaft for starting of the engine, a clutch for controlling the said reducing gears with respect to the shaft, and means for subsequently operatively connecting the shaft in driving association, at a different speed relationship, with the power element.

5. In a system of the class described, the combination with a combustion engine, of a shaft, gearing whereby the shaft is adapted to transmit power to and be driven by the engine, a power element for transmitting power to the shaft for starting of the engine and adapted to be driven from the shaft, reducing gears for connecting the shaft and the power element whereby the latter may operate, at one speed relationship, the shaft for starting of the engine, second gearing for connecting the shaft and power element for driving of the latter, and means for bringing the shaft into driving association with the second gearing, at a different speed relationship, after starting of the engine.

6. In a system of the class described, the combination with a combustion engine, of a shaft, gearing whereby the shaft is adapted to transmit power to and be driven by the engine, a power element for transmitting power to the shaft for starting of the engine and adapted to be driven from the shaft, reducing gears for connecting the shaft with the power element whereby the latter may operate, at one speed relationship, the shaft for starting of the engine, a clutch device for controlling the operative connection of the gears, second gearing for connecting the shaft and power element for driving of the latter, and clutch means for bringing the shaft into driving association with the second gearing, at a different speed relationship, after starting of the engine.

7. In a system of the class described, the combination with a combustion engine, of a shaft for transmitting power to and driven by the engine, a power element for transmitting power to the shaft for starting of the engine and adapted to be driven from the shaft, reducing gears for connecting the shaft with the power element whereby the latter may operate, at one speed relationship, the shaft for starting of the engine, a clutch device for controlling the operative connection of the gears, second gearing for connecting the shaft and power element for driving of the latter, and clutch means for bringing the shaft into driving association with the second gearing, at a different speed relationship, after starting of the engine; said last named clutch means being so associated with the first clutch means as to be rendered inoperative upon operative starting connection of the reducing gears and rendered operative upon declutching of said reducing gears.

8. In a system of the class described, the combination with a combustion engine of a shaft gearing whereby the shaft is adapted to transmit power to and be driven by the engine, a dynamo motor element for transmitting power to the shaft for starting of the engine, and adapted to be subsequently driven by the shaft, gearing connection between the shaft and dynamo motor whereby the latter may operate at one speed relationship, the shaft for starting of the engine, and means for subsequently operatively connecting the shaft in driving association, at a different speed relationship, with the dynamo motor element.

9. The combination with a combustion engine, of an electric starting element, and means for effecting starting connection between the engine and element and including shock absorbing means adapted to prevent the transmission of strains from the engine to the electric element upon assumption of self-propulsion of the engine.

10. In a system of the class described, the combination with a combustion engine, of a shaft for transmitting power to and adapted to be driven by the engine, and capable of being so driven at abnormal speed, of a power element, means for connecting the power element with the shaft whereby the latter may actuate the other, and means for preventing connection of the power element with the shaft during operation of the latter at abnormal speed.

11. In a system of the class described, the combination with a combustion engine, of a shaft for transmitting power to and adapted to be driven by the engine, a power element, means for connecting the power element with the shaft for starting of the engine, mechanism for connecting the shaft with the power element for driving of the latter, and means for preventing operative connection of the last named means immediately upon starting of the engine and incidental abnormal driving of the shaft.

12. In a system of the class described, the combination with a combustion engine, of a shaft for transmitting power to and adapted to be driven by the engine, a power element, means for connecting the power element with the shaft for starting of the engine, a clutch element for controlling the last named means, mechanism for effecting connection of the shaft with the power element for driving of the latter, and speed responsive means for preventing operative connection of the last named means after starting of the engine and during rotation of the shaft at an abnormal speed incident to initial self-propulsion of the engine.

13. In a system of the class described, combination with a combustion engine, of a shaft for transmitting power to and adapted to be driven by the engine, a power element, means for connecting the power element with the shaft, for starting of the engine, a clutch element for controlling the last named means, mechanism for effecting connection of the shaft with the power element for driving of the latter and including a clutch element, and means for preventing operative connection of the last named clutch during rotation of the shaft at an abnormal speed incident to initial propulsion of the engine.

14. In a system of the class described, the combination with a combustion engine, of a shaft for transmitting power to and adapted to be driven by the engine, a power element, reducing gears for connecting the power element with the shaft for starting of the engine, second gearing for connecting the shaft with the power element for driving of the latter, means for connecting the shaft with the last named gearing, and mechanism for preventing operative connection of the last named means during rotation of the shaft at an abnormal speed incident to initial propulsion of the engine.

15. In a system of the class described, the combination with a combustion engine, of a shaft for transmitting power to and adapted to be driven by the engine, a power element, means for connecting the power element with the shaft for starting of the engine, mechanism for effecting connection of the shaft with the power element for driving of the latter, a shock absorber associated with the last named means, for averting transmission of injurious strains to the power element, and means for preventing operative connection of the last named connecting mechanism during rotation of the shaft at an abnormal speed incident to initial propulsion of the engine.

16. In a system of the class described, the combination with a combustion engine, of a shaft for transmitting power to and adapted to be driven by the engine, a power element for transmitting power to the first shaft for starting of the engine and receiving power from the shaft for driving of said power element, gearing connection between the shaft and power element whereby the latter may operate, at one speed relationship, the shaft for starting of the engine, mechanism for subsequently operatively connecting the shaft in driving association, at a different speed relationship, with the power element, and means for preventing operative connection of the last named means during rotation of the shaft at an abnormal speed incident to initial propulsion of the engine.

17. In a system of the class described, the combination with a combustion engine, of a shaft for transmitting power to and adapted to be driven by the engine, a power element for transmitting power to the shaft for starting of the engine and receiving power from the shaft for driving of said power element whereby the latter may operate, at one speed relationship, the shaft for starting of the engine, mechanism for subsequently operatively connecting the shaft in driving association, at a different speed relationship, with the power element, and speed responsive means for preventing operative connection of the last named means during rotation of the shaft at an abnormal speed incident to initial propulsion of the engine.

In testimony whereof I have hereunto set my hand.

RICHARD VARLEY.

Witnesses:
MARY A. BARTH,
M. A. KELLER.